No. 838,732. PATENTED DEC. 18, 1906.
E. B. MAY.
AUTOMATIC RELIEF VALVE.
APPLICATION FILED APR. 21, 1906.

Witnesses:
Geo. H. Morse.
Charles I. Cobb

Inventor:
Edgar B. May
by: Hill & Hill
Attorneys.

THE NORRIS PETERS CO., WASHINGTON, D. C.

UNITED STATES PATENT OFFICE.

EDGAR B. MAY, OF CHICAGO, ILLINOIS, ASSIGNOR OF ONE-HALF TO JAMES H. DAVIS, OF CHICAGO, ILLINOIS.

AUTOMATIC RELIEF-VALVE.

No. 838,732.      Specification of Letters Patent.      Patented Dec. 18, 1906.

Application filed April 21, 1906. Serial No. 312,943.

*To all whom it may concern:*

Be it known that I, EDGAR B. MAY, a citizen of the United States of America, residing at Chicago, county of Cook, and State of Illinois, have invented certain new and useful Improvements in Automatic Relief-Valves, of which the following is a description.

My invention belongs to the general class of devices designed to automatically relieve steam-heating or similar systems from the accumulation of fluid arising by reason of condensation.

It has for its object the production of a simple, economical, and effective device for the purpose stated; and to this end it consists of the novel construction, arrangement, and combination of parts herein shown and described, and more particularly pointed out in the claims.

Figure 1:
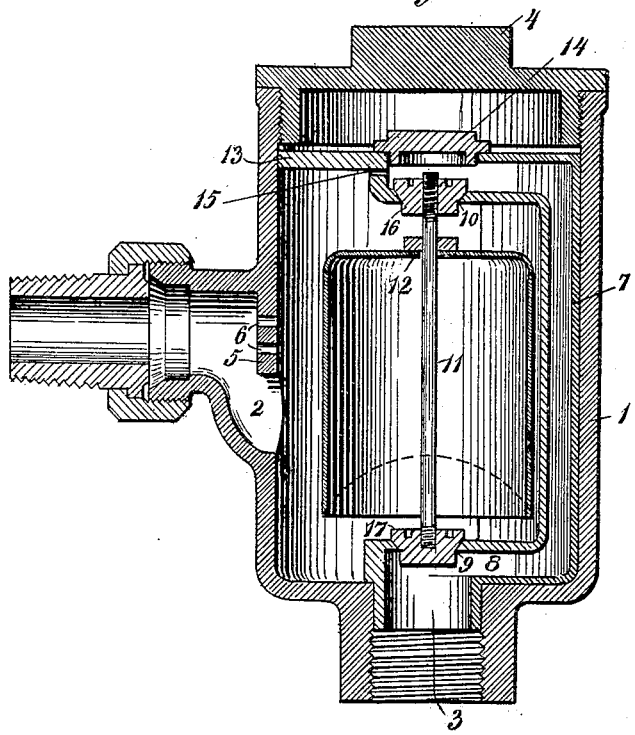
Figure 3:
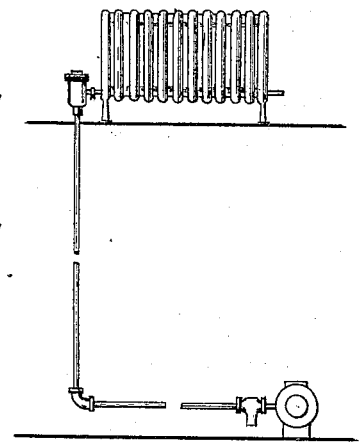
Figure 2:
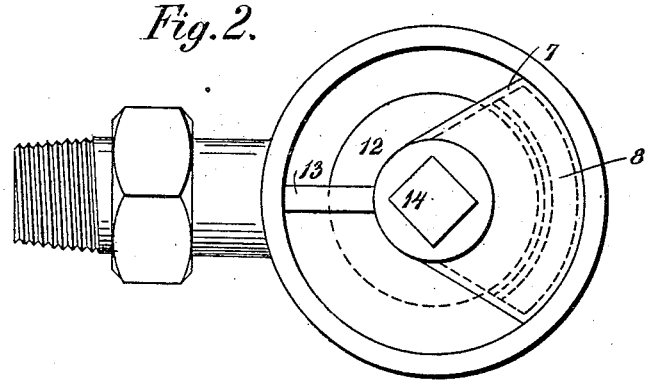
Figure 4:
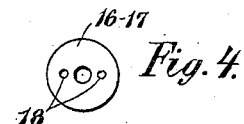
Figure 5:
Figure 6:

In the drawings, wherein like reference characters indicate like or corresponding parts, Figure 1 is a central longitudinal section through the device, showing the relative arrangement of the parts. Fig. 2 is a top plan of the same. Fig. 3 is a view showing the preferred position of my device in relation to a radiator and the other essential parts of the system; and Figs. 4, 5, and 6 are detail views of the preferred form of valve.

In the drawings, 1 represents an inclosing shell provided with an inlet 2, an outlet 3, and a closing-cap 4. The inlet is provided with a depending wall or baffle-plate 5, preferably having formed therein a series of apertures 6. By this means the float is protected from the direct impact of the incoming fluid or steam, while the apertures permit the escape of contained air to the upper part of the shell. The inlet and outlet are constructed to be suitably connected in the system, being shown as screw-threaded for that purpose. A part 7 is constructed to fit snugly within the shell 1 and has formed therein a duct 8, extending from the outlet to a point preferably near the top of the chamber inclosed by the shell and is provided with a valve-seat 9 near the outlet and a second valve-seat 10 near the top of the duct. The two valve-seats are preferably alined and substantially in line with the outlet 3, thus giving them a central position within the chamber. The part 7 incloses the duct, and the lower portion of said part fits snugly within the outlet, so as to prevent the escape of air or fluid through the outlet except by way of the valve. The valves 16 and 17 are preferably connected by a stem 11, having mounted thereon a float 12 of any preferred construction. As shown, the float consists of an inverted-cup-shaped member, while the dotted lines near the bottom of the same show the preferred form when the float is closed. The stem 11 also carries valves 16 and 17 of suitable form and dimensions to coöperate with the valve-seats 9 and 10. The upper part of the part 7 is maintained in proper relative position with the chamber by means of the arm 13, extending from the central portion thereof to one side of the chamber, while the main part of said part 7 is preferably segmental in form and extends to the opposite wall of the chamber. It is also formed with a central aperture at its top, provided with a suitable screw-threaded cap 14, which makes possible the proper assembling of the parts. In the preferred construction also the upper portion of the part 7 has formed therein an air-duct 15, permitting imprisoned air to slowly escape into the duct 8.

In assembling the parts the valve-stem 11, having the valve 16 removed therefrom and carrying the valve 17 and the float 12, is positioned within the part 1. One or both of the valves are adjustably mounted upon the stem 11, so that the distance between them may be regulated as is found necessary to secure coöperation. After the float is in position the valve 16 may be secured in position upon the stem through the opening in the upper part of the part 7, after which the cap 14 is placed in position. As thus assembled the entire part 7 may be readily inserted within the shell 1 and the cap 4 fastened upon the shell. The valves are preferably duplicates of one another, so as to be readily interchangeable, as well as for convenience in assembling the parts, and may be provided with any suitable means for attaching a wrench in securing them in position upon the stem. As shown in Fig. 4, the tops of the valves are provided with spanner-holes 18 or equivalent means for the proper engagement of a suitable spanner or wrench.

It will be observed that by my improved construction the valves are perfectly balanced, the pressure upon the chamber side thereof being balanced by the two faces, whatever differential there may be in the surfaces being counterbalanced by substantially the same differential upon the duct side of the valves.

In operation the water of condensation from the radiators or other portions of the system enters the shell 1 through the inlet 2. Any untrained air or steam passes by way of the openings 5 and 6 into the upper part of the shell until sufficient water has accumulated in the shell to operate the float.

Having thus described my invention, what I claim as new, and desire to secure by Letters Patent, is—

1. In a device of the kind described, an inclosing shell provided with an inlet and an outlet, and with a duct extending from the outlet to a point higher in the shell, and two valve-seats connected with the duct, in combination with a float arranged between the valve-seats and provided with a valve for each seat, whereby the movement of the float will control the operation of the valves.

2. In a device of the kind described, an inclosing shell provided with an inlet and an outlet, in combination with a removable part having formed therein a duct extending from the outlet to a point within the shell and provided with two valve-seats, and a float arranged between the valve-seats provided with a valve for each seat, whereby the movement of the float will control the operation of the valves.

3. In a device of the kind described, an inclosing shell provided with an inlet and an outlet, in combination with a removable part formed to be seated within the shell to close the outlet, and provided with a duct extending from the outlet to a point near the upper portion of the shell, and two alined valve-seats connecting the duct, a float arranged between the valve-seats provided with a valve for each seat and relatively adjustable to each other, whereby the movement of the float will control the operation of the valves.

4. In a device of the kind described, an inclosing shell provided with an inlet and an outlet, in combination with a removable part formed to close the outlet and provided with a duct extending therefrom to a point in the upper portion of the shell, two alined valve-seats formed in said part permitting the entrance of fluid in the duct, a removable cap 14 arranged to close an opening in the top of said part, and a float arranged between the valve-seats, provided with relatively adjustable valves for said seats.

5. In a device of the kind described, an inclosing shell provided with an inlet and an outlet, a removable part 7 constructed to close the outlet and provided with a duct 8 extending from the outlet to a point in the upper portion of the shell, valve-seats 9 and 10 formed in said part, and an air-duct 15 extending through the wall of said part, in combination with a valve-stem 11 having mounted thereon valves 16 and 17 for said seats, and a float 12 whereby the operation of the float will control the operation of the valves.

6. In a device of the kind described, a shell 1 provided with an inlet 2 and an outlet 3 with a depending wing 5 in said inlet, in combination with a removable part 7, having formed therein a duct 8 and valve-seats 9 and 10, a valve-stem 11 provided with valves 16 and 17 for said seats, and having a float mounted on said stem.

7. In a device of the kind described, an inclosing shell provided with an inlet 2, a foraminated depending wall in said inlet, an outlet 3, a duct 8 extending from the outlet to a point higher in the shell, provided with valve-seats 9 and 10, in combination with a float arranged between the valve-seats and provided with a valve for each seat.

In testimony whereof I have hereunto signed my name in the presence of two subscribing witnesses.

EDGAR B. MAY.

Witnesses:
BURTON U. HILLS,
CHARLES I. COBB.